Sept. 20, 1966  A. U. BRYANT  3,273,854
ELBOW VACUUM VALVE
Filed Sept. 10, 1963  7 Sheets-Sheet 6
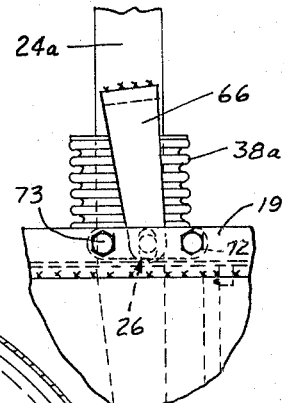
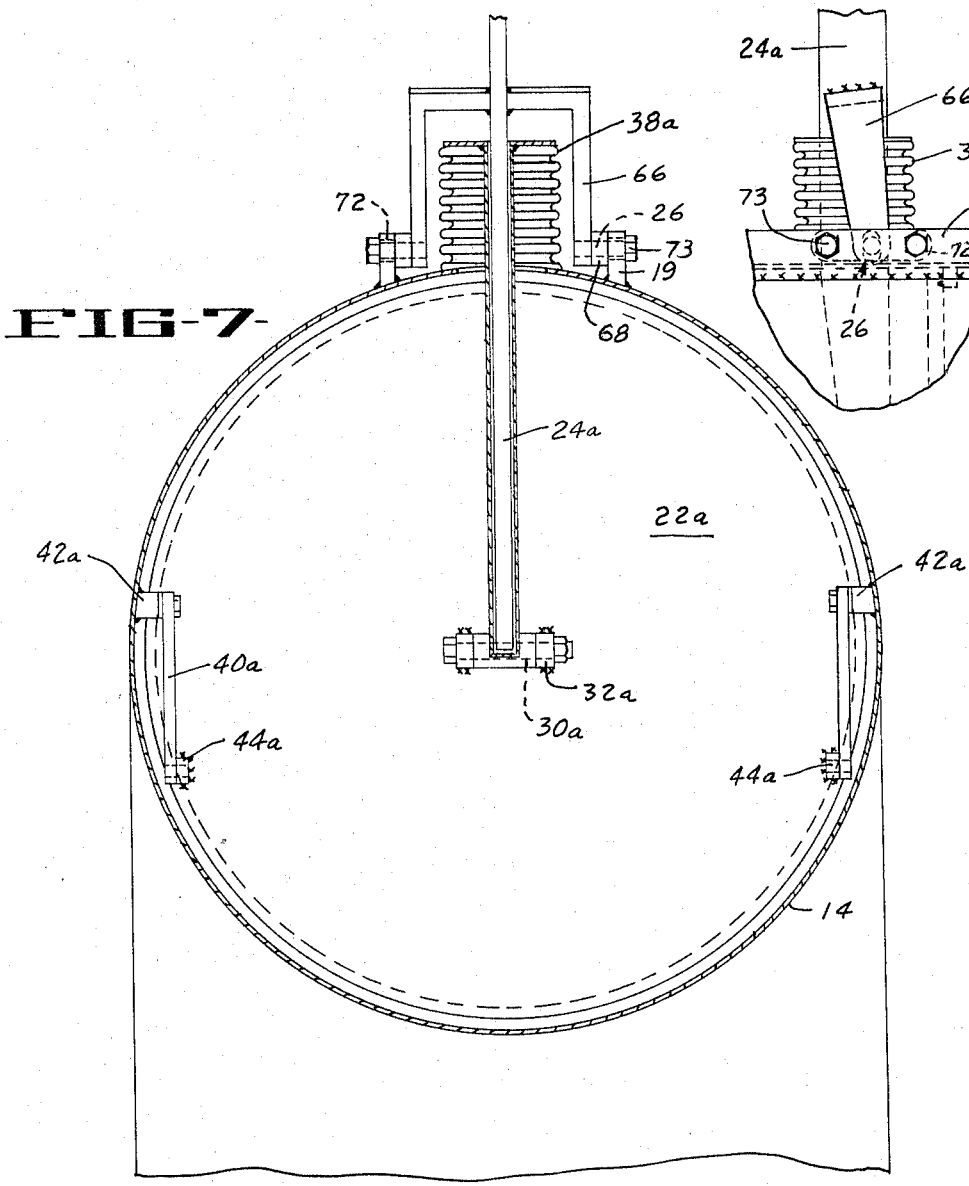
INVENTOR.
AUSTIN U. BRYANT
BY
ATTORNEY

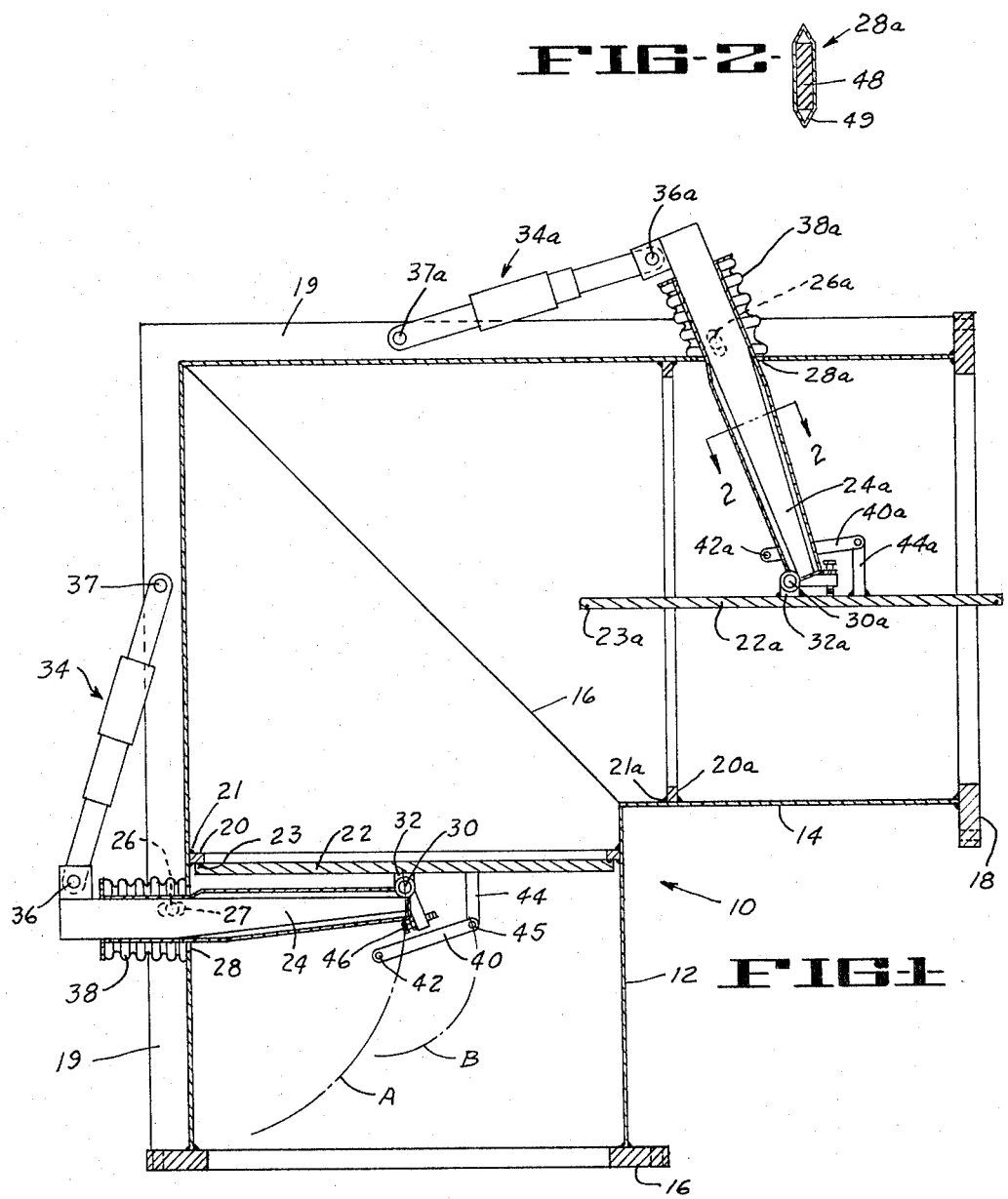

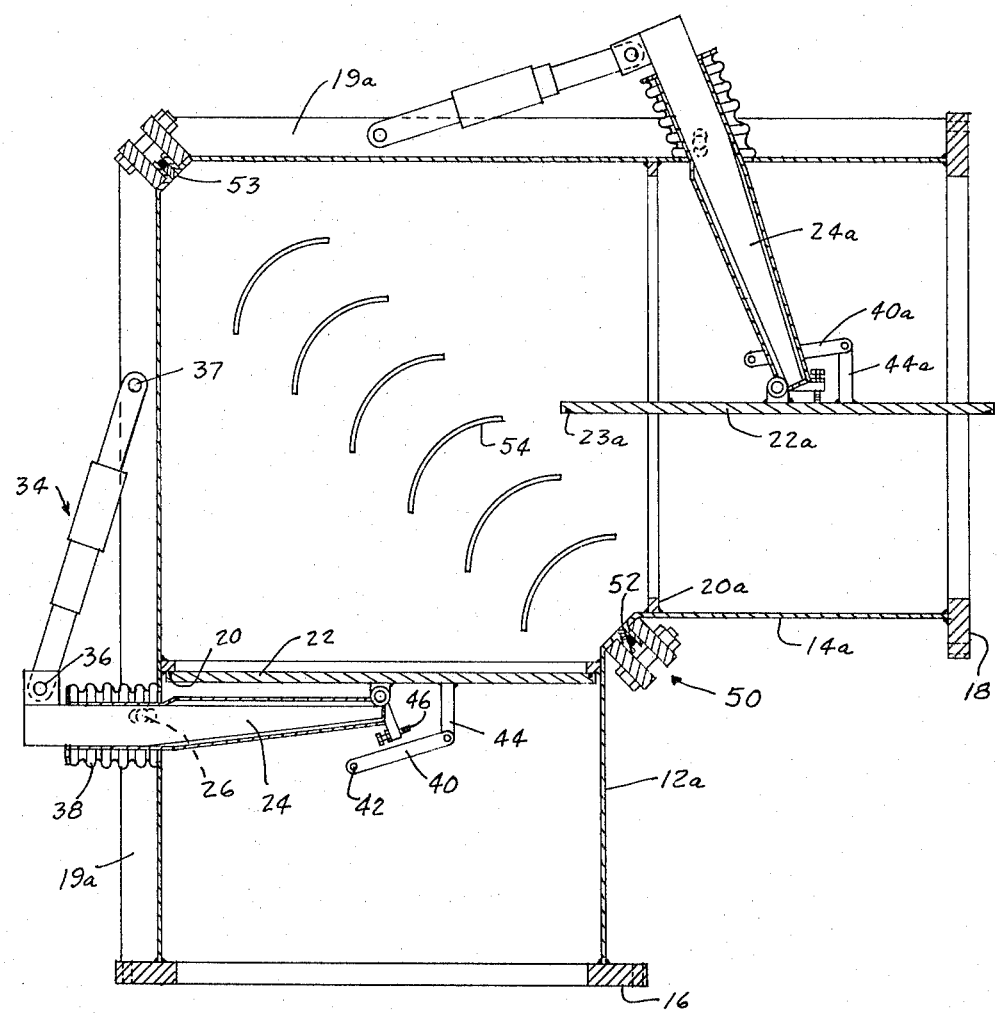

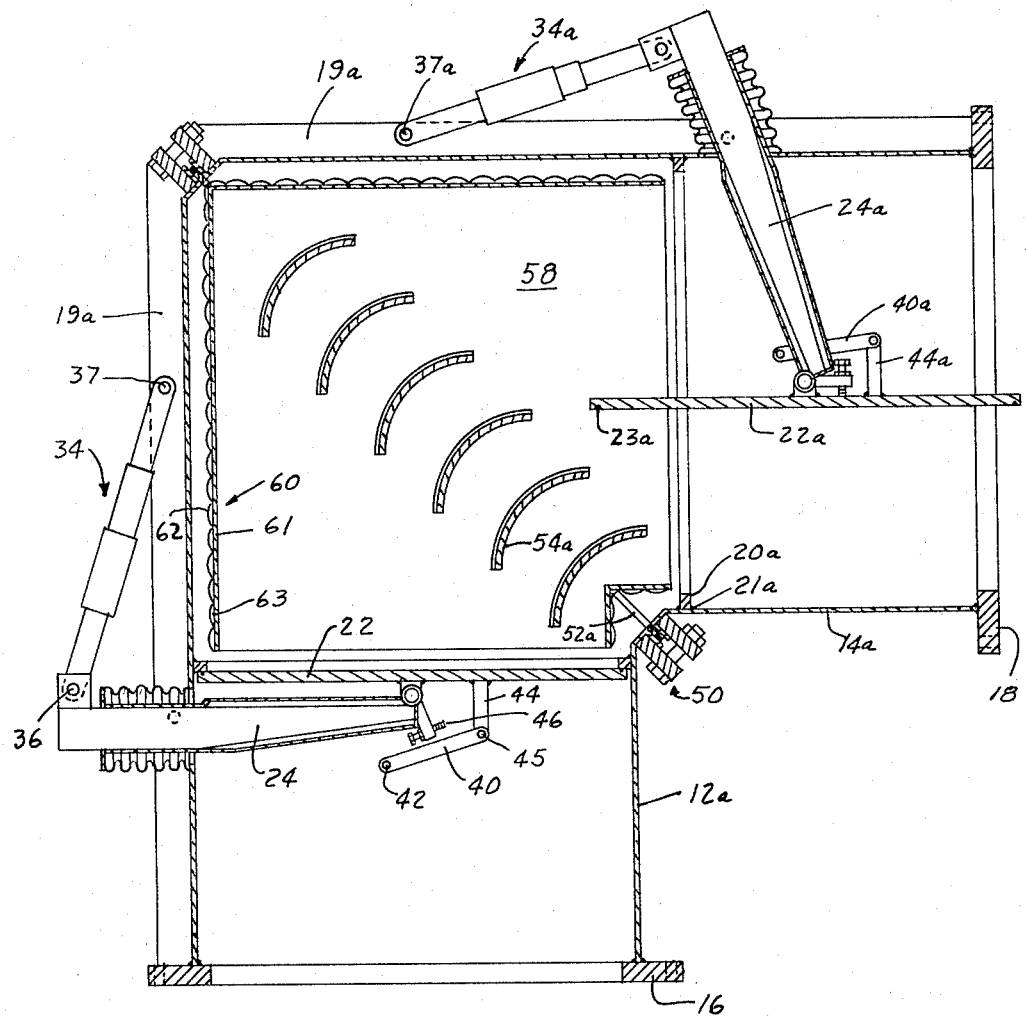

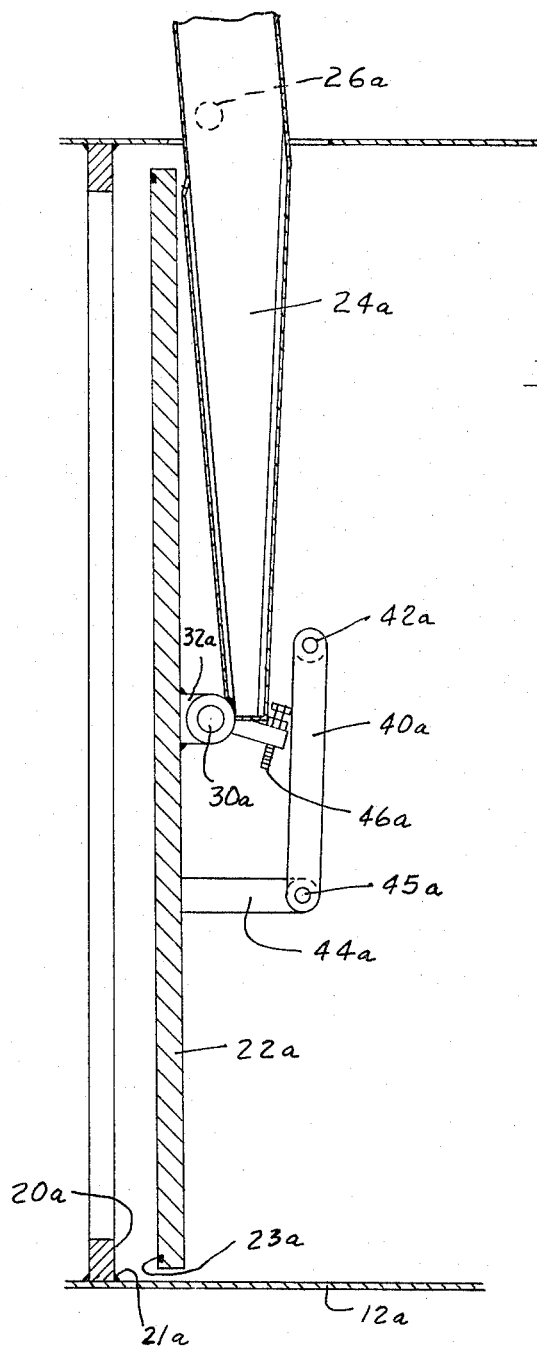

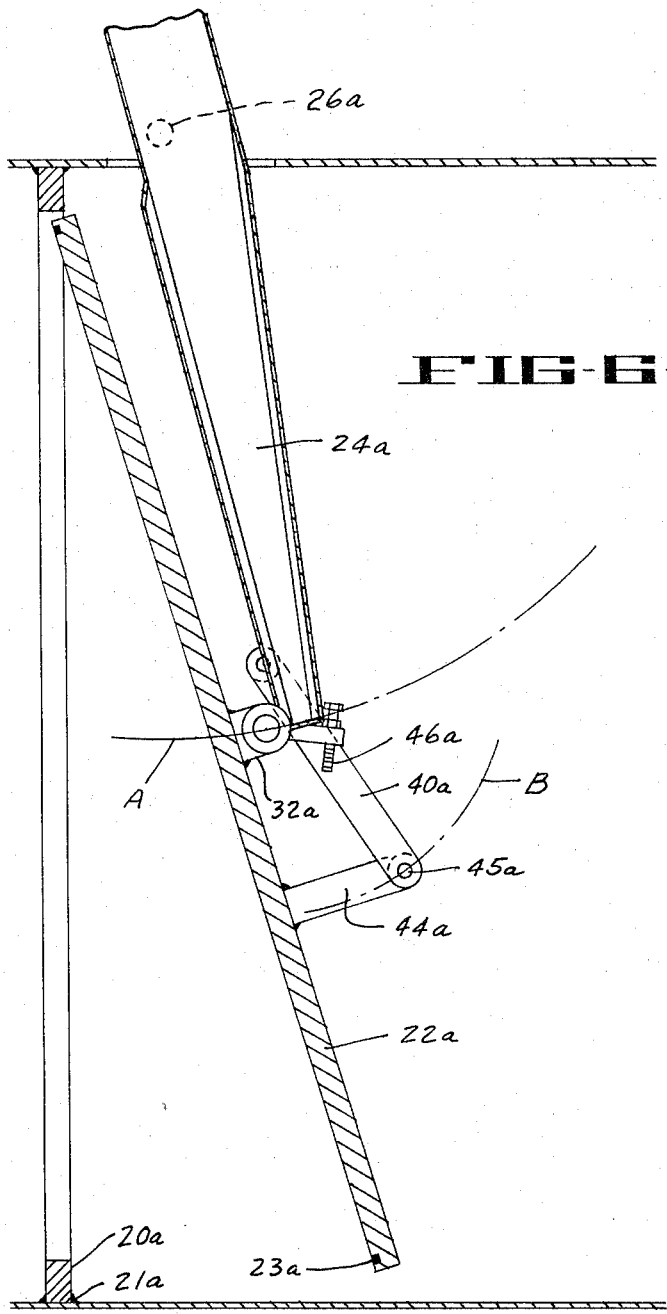

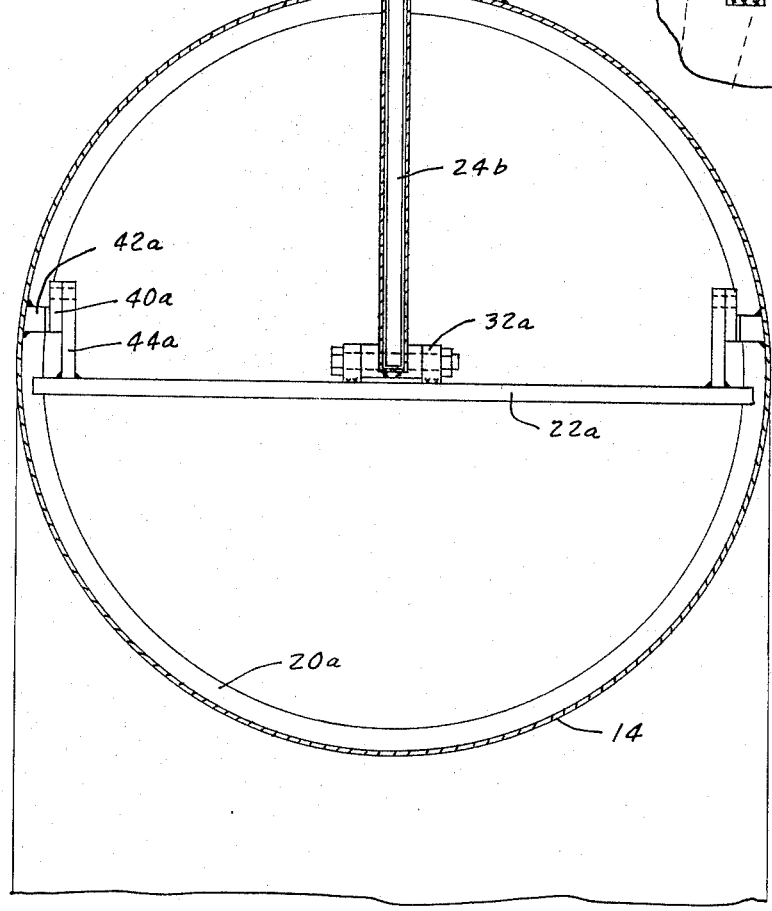
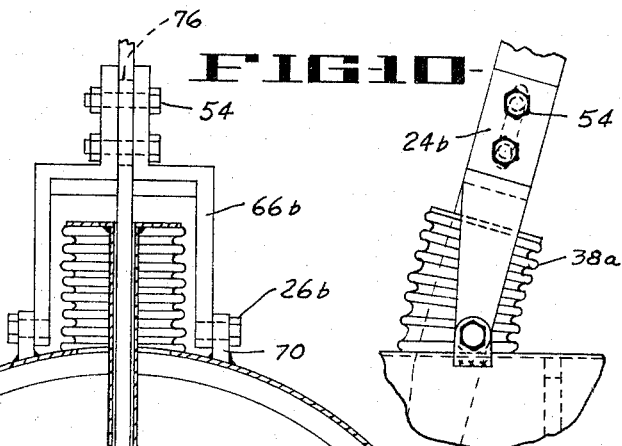

United States Patent Office 3,273,854
Patented Sept. 20, 1966

3,273,854
ELBOW VACUUM VALVE
Austin U. Bryant, Walnut Creek, Calif., assignor to Grove Valve and Regulator Company, Oakland, Calif., a corporation of California
Filed Sept. 10, 1963, Ser. No. 307,963
4 Claims. (Cl. 251—228)

This invention relates to an elbow vacuum valve and, more particularly, to an elbow duct provided with a compact, readily operable valve closure member in each arm thereof, and preferably including a cold trap for installation in a chamber evacuation system.

In evacuation systems for exhausting a chamber, it is common practice to utilize diffusion vacuum pumps into which the gases are drawn through a vertical downpipe. It is often desirable, for reasons for convenience and space limitations to exhaust a chamber through a side, rather than a bottom, opening through a horizontal duct. Consequently, it is common practice to provide an elbow duct in such evacuation system. It is of further advantage to provide an elbow duct in a vacuum system as a container for an elbow cold trap wherein the gases are caused to impinge upon cryogenic panels so that condensable components may be withdrawn from the gas and deposited on the panels, thus augmenting the work of the diffusion pump.

In connection with such hydraulic systems, it is desirable to provide a valve to prevent vacuum loss in the event the diffusion pump is inactivated. However, with ducts employed in many systems up to 36 inches in diameter and larger, conventional valves become extremely unwieldy and may not be adapted to space limitations. Moreover, in many valves such as gate valves, ball valves, butterfly valves and the like the valve member closes in sealed relationship by moving against the valve seat in a sliding action. It is obvious that in a high vacuum system, normal lubricants cannot be maintained on sealing surfaces and that such sliding action tends to abrade and scratch closely ground metal surfaces and to grate and cut resilient seals, such as O-rings.

It is, therefore, an object of this invention to provide a vacuum valve with complementary sealing surfaces, which valve may be operated without damage either to the sealing surfaces or to resilient seals, even in the absence of lubrication.

In a vacuum system for evacuating a chamber, it is occasionally necessary either to vent the chamber or to shut down the pump. When a cold trap is interposed in such a system it is desirable to maintain the vacuum therein. Thus, where either one or the other of the diffusion pump and chamber is thus lost to vacuum, it is further desirable to keep the cold trap elbow isolated from that one lost to vacuum while still in communication with the other. With only one valve this cannot be done in all cases and, additionally, under some circumstances the valve will have to seal against the pressure differential.

It is, therefore, a further object of this invention to provide an elbow duct for a vacuum system having a valve compactly arranged therewith.

It is a further object of this invention to provide an elbow duct having a self-contained valve mechanism selectively operated for isolating the elbow from communication with the diffusion pump or with the chamber being evacuated and, in either case, with the pressure differential aiding the valve closing action.

In carrying out this invention, the elbow duct is provided with two annular valve seats, each of which is sealed around the inside of one of the two intersecting duct sections, as by welding. For cooperative association with each valve seat there is provided a flat valve disc or closure plate that is pivoted from a first position wherein it is disposed transversely across the duct and in firm sealing engagement with the valve seat to a second position in which it is disposed parallel to the axis of the duct. This movement is accomplished by means of a unique linkage that initially moves the valve from its seat perpendicularly and a short distance along the axis of the duct without pivoting it so that there is no sliding or grating across the resilient seal. Thereafter, the linkage pivots the closure plate through about 90° to its full open position.

The specific details of the invention, and other objects and advantages thereof will become apparent from the description following when read in connection with the accompanying drawings, wherein:

FIG. 1 is a section view of the elbow valve of this invention showing one valve closure member in open position and the other in closed position;

FIG. 2 is a section view of an actuator arm or valve closure member taken along line 2—2 of FIG. 1;

FIG. 3 is a section view of another form of elbow valve in which a series of turning vanes are provided;

FIG. 4 is a section view of another form of elbow valve provided with a cold trap;

FIG. 5 is an enlarged, partial section view of a single valve and operating mechanism with the valve slightly open;

FIG. 6 is a similar enlarged section view showing the valve in partially open position;

FIG. 7 is a section view of elbow duct looking along one axis thereof showing one form of valve operating mechanism and showing the valve closure plate in closed position;

FIG. 8 is a partial side view of the valve operating mechanism of FIG. 7;

FIG. 9 is a section view taken along an axis of a duct showing a modified form of valve operating mechanism; and FIG. 10 is a partial side view of the modified valve operating mechanism of FIG. 9.

Referring now to FIG. 1, the vacuum valve of this invention comprises an elbow duct 10 comprising two perpendicular conduits 12 and 14 in continuous communication. The conduits 12 and 14 are secured together as by welding along a diagonal seam 16 which in the event the conduits 12 and 14 are circular in cross section, is of elliptical configuration. On the open end of each conduit 12 and 14 is some suitable means, such as the flanges 16 and 18, respectively, for securing the elbow duct into a fluid flow line. For example, the flange 16 may be secured to the intake of a vacuum pump and the flange 18 secured around an opening in the wall of a chamber to be evacuated. Preferably, the conduits are strengthened by longitudinal ribs 19 each of which is preferably secured at its opposite ends to the flanges 16 and 18.

Secured within each of the conduits 12 and 14 is a valve seat 20 and 20a, respectively, each of which is sealed around the inner surface of a conduit wall as by welding at 21, 21a, and in operative association with each valve seat 20, 20a, is a valve closure plate 22, 22a, carrying suitable seal means 23, 23a around the edge thereof. While, as shown in FIGS. 7 and 9 the valve closure plates 22 and 22a are of circular configuration, it is to be understood that I am not limited to that specific shape and the particular configuration selected is best determined by the cross sectional shape of the conduits 12 and 14.

Valve closure actuator arms 24 and 24a are pivotally connected at 26, 26a to the outside of the corresponding duct 12, 14 and extend through an opening 28, 28a in the elbow duct 10 so that their free ends are pivotally connected at 30, 30a to a bearing block 32, 32a carried on the backs of the valve closure plates 22 and 22a. To the other end of each actuator arm 24, 24a, is pivotally connected at 36, 36a some suitable actuating means, such as a hydraulic cylinder 34, 34a which, in turn, is pivotally connected at 37, 37a between adjacent elbow duct strength ribs 19. If desired, the cylinder units 34, 34a could be replaced by threaded stem and nut arrangements which would also be pivotably connected at each end to swing through a small angle as in the case of the cylinder units 34, 34a. In order to seal the openings 28, 28a against leakage, a flexible bellows 38, 38a is secured in sealed relation around each actuator arm 24, 24a and around the corresponding opening 28, 28a to bend with pivotal movement of the arm.

Also pivotally connected to the conduits 12 and 14 are shorter, guide or control arms 40 and 40a which are pivoted to the conduits 12 and 14 at 42, 42a and to bearing member or lugs 44, 44a secured to the back of each closure plate 22, 22a. As shown in FIGS. 7 and 9, the short control arms are preferably provided in pairs with each being pivotally connected at 42, 42a to a side of the conduit and to one of two arms 44 carried at each side of the closure disc.

Referring to FIG. 1, when a hydraulic cylinder 34 is actuated, the actuator arm 24 controlled thereby is caused to pivot along the path A causing the closure plate 22 to move away from the valve seat 20 and the arm 44 is constrained to move along the path B by virtue of its pivotal connection with the control arm 40. It will be noted that the initial portions of the arcs A and B are both in directions substantially normal to the valve seat 20. Since both pivot points 30 and 45 move in substantially parallel relation during this period there is little tendency to produce any relative rotational movements between them. Hence, all points around the closure plate 22 will lift uniformly and perpendicularly from the valve seat 20 without sliding or scraping against the valve seat 20. After the valve closure plate has moved transversely from the seat with virtually no tendency to score the unlubricated sealing surfaces of the closure plate 22 and valve seat 20, further pivotal movement of the actuator arm 24 will produce a sharper pivotal movement of the valve closure plate. This pivotal movement is produced because the pivot point 45 fixed relative thereto is constrained by the arm 40 to travel through the arc B of smaller radius than that of the actuator arm. That is, the control arm pivot 30 and actuator arm pivot 45, both of which are fixed relative to the closure plate travel along different arcs to swing the closure plate about the pivot 30, 30a to the intermediate position shown in FIG. 6. Thereafter, during continued pivotal movement of the actuator arm 24 the control arm 40 or 40a draws the pivot point 45 or 45a farther away from the path of arc A to pivot the closure plate 22, until it is engaged by an adjustable stop member 46, 46a which defines the fully open position of the closure plate shown in the position of closure plate 22a in FIG. 1.

As hereinabove stated, the elbow valve of this invention is particularly adapted for use in evacuation of a chamber whereby the relatively thin gauge of conduits 12 and 14 will be opposed only by atmospheric pressure. With the construction shown, the elbow may be isolated from the pump or the evacuation chamber, or both by selectively closing the valves 22 and 22a. It will also be seen that with the valve plate 22 closed and the pump shut down so that the duct 12 loses vacuum, pressure differential will urge the valve plate 20 against the seat. Similarly, with the duct 14 pressurized, as by venting the chamber being evacuated, pressure differential will hold the valve plate 22a tightly sealed.

Referring to FIG. 2, the actuator arms 28 or 28a are preferably formed of stainless steel, or the like, when used in connection with vacuum pumps, or if desired, each arm may comprise a core 48 of any suitable material, such as a carbon steel, covered with a protective coat of thin gauge stainless steel 49.

Referring now to FIG. 3 there is shown a similar elbow valve except that the joint between the conduit 12a and 14a is a bolted flange connection 50 between which is secured an annular vane carrier frame sheet 52 across the opening of which 53 is supported a series of concave turning vanes 54 which direct the flow of fluid around the corner in a smooth flowing manner. As shown in FIG. 4, the vane carrier frame sheet 52a may support a complete cold trap assembly 58 comprising an inner concentric elbow duct having double walls 60 which may be formed by spot welding inner and outer walls 61 and 62 in a waffle pattern to form flow passages 64 for a cryogenic fluid such as liquid nitrogen. If desired, the turning vanes themselves 54a may also be formed of double wall construction to accommodate a cryogenic fluid to present cold surfaces to the gases being exhausted in order to withdraw condensible gaseous components and to augment the work of the diffusion pump.

Referring now to FIGS. 7 and 8, there is shown a mechanism for adjusting the lever arrangement for operation of the valve gate 22. Specifically, there is secured to one end of the actuator arm 24 a pivot pin carrier 66 which supports the pivot pins 26 about which the actuator arm 24 is pivotally mounted. The pivot pins are rotatably mounted in movable bearing members 68 which are secured to the reinforcement ribs 19 by bolts 73 that engage in enlarged holes 72 in the bearing members 68. Thus, by loosening the pivot bolt 26 the bearing member can be moved to vary the point about which the actuating arm pivots to control the angle of the gate as it moves away from the valve seat. This can be seen most clearly by reference to FIG. 5 wherein it is apparent that movement of the pivot axle 26 relative to the guide arm pivot points 42 will vary the angle of the valve gate in the plane of the sheet. Movement of just one bearing block 68 in FIG. 7 will cause the gate 22 to tip in a plane perpendicular to the sheet of FIG. 5.

A similar adjustment device is shown in FIGS. 9 and 10 wherein the effective length of the actuator arm is varied by moving the arm 24 relative to the pivot pin carrier 66b by loosening the bolts 75 and adjusting them in an accommodating slot 76 in the actuator arm. Thus, while the pivot pin carrier pivots on the pins 26b in bearing support 70, always about the same axis, position of the pin carrier relative to the free end of the lever 24 may be adjusted.

After adjustment by either method, the relatively moveable parts are preferably tightly secured together or even welded to insure against movement.

While this invention has been described in connection with preferred embodiments thereof, it is apparent that modifications and changes therein may be made by those skilled in the art without departing from the spirit and scope of this invention as defined by the claims appended hereto.

Having described my invention, I claim:
1. A valve comprising:
a valve body including a flow passageway,
a valve seat in said body,
a valve closure plate,
an actuator arm; a first pivotal connection between said body and said actuator arm enabling said arm to swing in a plane transverse to said valve seat,
a second pivotal connection between said actuator arm and said closure plate,
a shorter control arm pivotally connected between said valve body and said closure plate to swing in a plane parallel to said actuator arm,
adjustment means for varying the spacing between said first and second pivotal connections, and
means for pivoting said actuator arm to swing said pivotal connection from a first position wherein said closure plate engages said valve seat and a second position retracted therefrom.

2. The valve defined in claim 1 wherein:
said control arm is of a length to pivot said closure plate about said pivotal connection to dispose said closure plate transverse to said valve seat when said pivotal connection is in said second position.

3. The valve defined in claim 1 wherein:
both said control arm and said actuator are disposed to swing in arcs the chords of which are transverse to said valve seat during initial movement of said pivotal connection from said first position so that there is little relative angular displacement between said arms during said initial movement.

4. A valve comprising:
a valve body including a flow passageway,
a valve seat in said body around said flow passageway,
a valve closure plate,
an actuator arm extending into said body from the exterior thereof,
a first pivotal connection between said body and said actuator arm enabling said actuator arm to swing in a plane generally perpendicular to said valve seat,
a flexible sleeve sealed around said arm and to said body,
means outside said valve body for pivoting said actuator arm,
a pivotal connection between said actuator arm and said closure plate,
a shorter control arm pivotally connected between said valve body and said closure plate to swing parallel to said plane,
said actuator arm being disposed to swing between a first position with said closure plate engaged on said seat and a second position displaced therefrom,
adjustment means for varying the spacing between said first and second pivotal connections, and
both said control arm and said actuator arm being disposed to move in nearly parallel arcs transverse to said valve seat during initial movement of said closure plate from said first position.

References Cited by the Examiner

UNITED STATES PATENTS

| 1,065,466 | 6/1913 | Oie | 137—613 |
| 1,483,390 | 2/1924 | Snow | 137—613 |
| 2,216,046 | 9/1940 | Peck | 285—179 X |
| 2,443,036 | 6/1948 | Hopkins | 251—228 |
| 2,873,942 | 2/1959 | Drane | 137—305 X |

FOREIGN PATENTS

| 1,211,088 | 10/1959 | France. |
| 1,114,452 | 10/1961 | Germany. |
| 418,003 | 10/1934 | Great Britain. |

WILLIAM F. O'DEA, *Primary Examiner.*

ALAN COHAN, *Examiner.*